Sept. 20, 1955 K. J. KNUDSEN 2,718,148
MULTIPLE TEMPERATURE INDICATOR AND OVERTEMPERATURE ALARM
Filed April 21, 1948 4 Sheets-Sheet 1
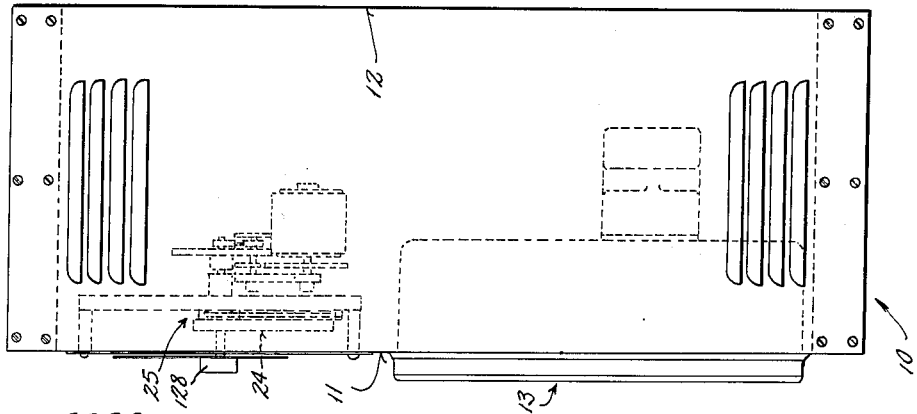
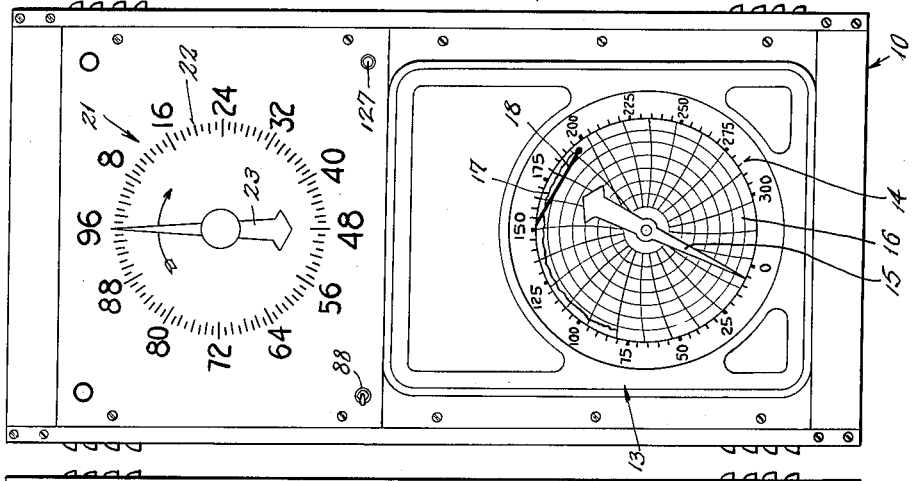
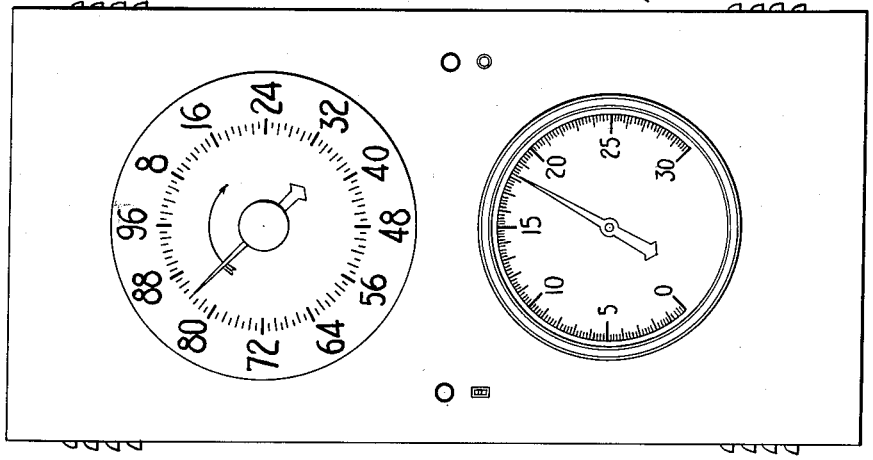
INVENTOR.
Knud J. Knudsen
BY
Johnson and Kline
ATTORNEYS Sept. 20, 1955 K. J. KNUDSEN 2,718,148
MULTIPLE TEMPERATURE INDICATOR AND OVERTEMPERATURE ALARM
Filed April 21, 1948 4 Sheets-Sheet 2

INVENTOR.
Knud J. Knudsen
BY
Johnson and Kline
ATTORNEYS

Sept. 20, 1955          K. J. KNUDSEN          2,718,148
MULTIPLE TEMPERATURE INDICATOR AND OVERTEMPERATURE ALARM
Filed April 21, 1948          4 Sheets-Sheet 3
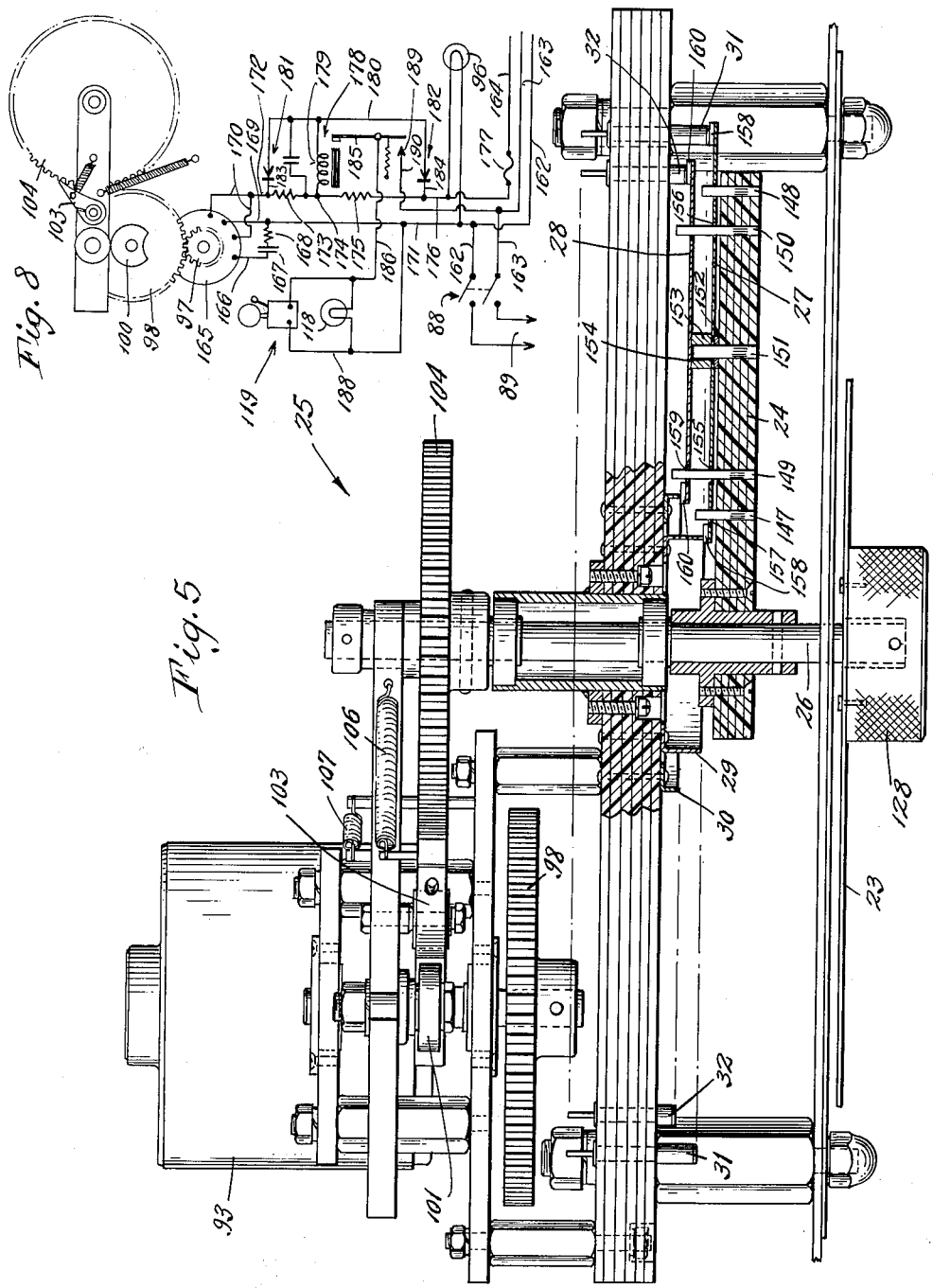
INVENTOR.
*Knud J. Knudsen*
BY
*Johnson and Kline*
ATTORNEYS

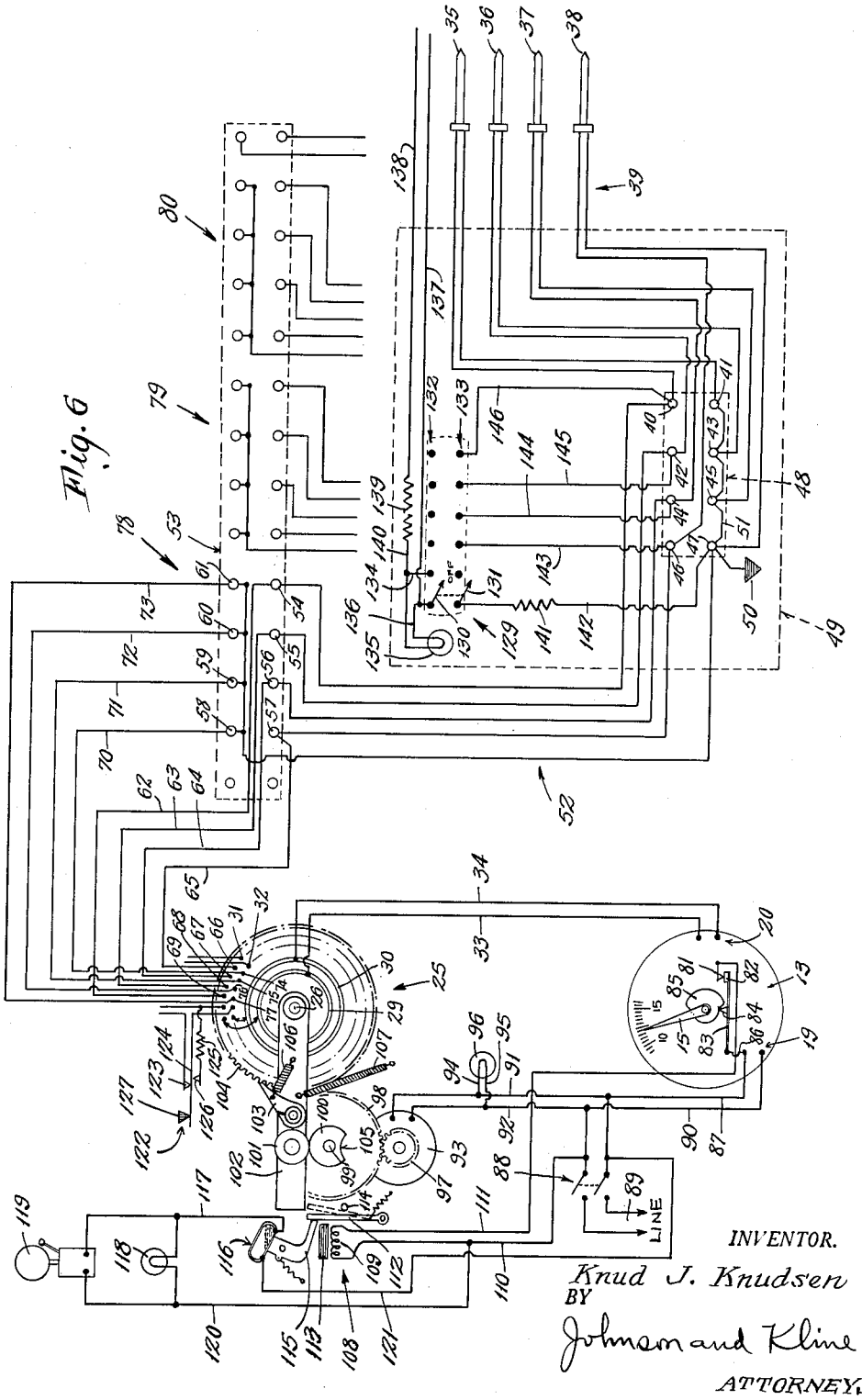

United States Patent Office 2,718,148
Patented Sept. 20, 1955

2,718,148

MULTIPLE TEMPERATURE INDICATOR AND OVERTEMPERATURE ALARM

Knud J. Knudsen, Naugatuck, Conn., assignor to The Lewis Engineering Company, Naugatuck, Conn., a corporation of Connecticut Application April 21, 1948, Serial No. 22,328

6 Claims. (Cl. 73—342)

This invention relates to means for indicating sequentially the temperatures of a plurality of devices subject to heating, and for giving an alarm when any one of said temperatures exceeds a predetermined value.

In the operation of machinery, equipment and the like, failure often results when the temperatures of certain parts or components, which may be quite numerous, exceed predetermined safe operating values. For example, in the operation of mercury-vapor boilers, the temperatures of the boiler tubes must not exceed certain limits if failure of the boiler is to be prevented. Or, in the operation of a bank of motor generator sets, the temperatures of the bearings must be kept below certain specified values to prevent failure of the sets. Often such failure will have serious consequences, and therefore it is extremely important that a periodic and reliable check be had on the components or parts which are liable to failure because of the excessive temperature.

Considering the case of a single motor generator set, four bearings might require periodic checking to insure continued operation of the set. In some installations where a large number of motor generator sets are in operation, as for example, twenty-four, this would require a periodic checking of a total of ninety-six different bearings, and all of these bearings should be checked within a relatively short period of time so that they may be continually rechecked before a dangerous condition develops which would result in failure of a piece of equipment.

The present invention provides an improved, extremely reliable multiple temperature indicator and overtemperature alarm device, and an improved method whereby the checking, within a short interval of time, and the continual rechecking of a very large number of instrumentalities which are subject to heating and which may overheat can be readily accomplished. Considering the above-mentioned installation of twenty-four motor generator sets, the device of the present invention is able to check the temperature of all ninety-six bearings of the installation in an interval as short as three minutes, whereupon it will begin a recheck of such bearings and in each succeeding three minutes will completely recheck the entire number of bearings. If any one of the bearings should begin to overheat, this condition therefore would be discovered in three minutes at the most, and on an average in a much less period of time. When one of the bearings of the installation manifests a rise in temperature above the predetermined safe value, the device will automatically give an alarm and an indication as to which bearing is overheating, and will further be rendered inoperative to continue rechecking the bearings, thereby making it imperative that attention be given to the overheated condition, and that the device be again started in its rechecking, under penalty of possibly more extensive damage occurring if the alarm is ignored or neglected.

The device shown herein as embodying the invention, by which this is accomplished, comprises a large rotary selector switch having ninety-six positions, each position connecting an indicating pyrometer instrument to a different pyrometer circuit having a resistance thermometer bulb associated with a different bearing respectively of the installation. The selector switch, in the specific embodiment of the invention illustrated herein, dwells on each setting or position for approximately one and two-thirds seconds, and consumes approximately one-fifth second to move from one setting to the next. In each of the one and two-third second dwells, the indicating pyrometer instrument will have had time to respond to the necessary extent to the particular pyrometer circuit connected with it through the selector switch, and will either indicate the temperature on a dial, or record the temperature on a chart or both. If any one temperature is found to exceed the predetermined safe value, the device will be evacuated to give an alarm by energizing a danger signal light and by sounding a gong, and also the selector switch will be halted in its progressing movements until again started by the operator. The operator may immediately restart the selector switch, after which steps may be taken to correct the overheated condition, the device meanwhile continuing to function to check the temperatures of the other bearings.

In the present improved device, if it is desired at any time to check the temperature of any one particular instrumentality, this may be easily and quickly done regardless of the setting of the selector switch, by merely manually advancing the switch arm to the desired position to check such instrumentality, the switch being so arranged that such advance may be effected without impairing the operation of the automatic actuating means therefor.

Means are provided, comprising a manually operable switch and a resistor of suitable value, for connection to one of the pyrometer circuits whereby the signal system of the device and also the indicating or recording instrument may be quickly checked for operativeness at any time.

The improved device includes means whereby any particular pyrometer circuit may be normalized, that is, maintained in a condition to indicate a normal temperature, independently of the resistance bulb in the circuit, thereby enabling the bulb to be removed and replaced, or enabling the circuit to the bulb to be repaired, or both, without an alarm being sounded and the selector switch stopped.

The selector switch and automatic actuating mechanism therefor are constructed in a novel and advantageous manner, to be extremely rugged and reliable in operation, and to not require attention over a considerable period of use. By virtue of the particular stepped movement of the selector switch whereby it has a relatively short dwell on each set of contacts, and has an extremely short interval of movement between contacts, together with the compact and concentric arrangement of the sets of the contact points so that each set spans a very small arc, the device is capable of handling an extremely large number of pyrometer circuits, thereby making it adaptable for use in installations having a large amount of equipment.

The novel actuating mechanism illustrated herein in one embodiment of the invention, for operating the selector switch comprises in addition to a pawl and ratchet wheel and a continually rotating cam for operating the pawl, a relay the armature of which is adapted to maintain the pawl out of engagement with the actuating cam when the relay responds because of an overheated condition.

After the selector switch has once been automatically halted by an overheated condition, the mere manual shifting of the switch blades to the next set of contacts automatically resets the halting mechanism whereby the switch was stopped, thereby resulting in the switch again being automatically advanced step-by-step to recheck the pyrometer circuits of the installation. The substitution of the normalizing resistor mentioned above, in a pyrometer circuit which has indicated an excessive temperature, will enable the selector switch and actuating mechanism therefor to continue its operation in a normal manner while the defect is being remedied.

While the invention is illustrated herein in connection with the measurement of temperature it is not restricted to such use since it obviously has utility with other variables or conditions which may alter the measurable value or characteristic of translating devices, or with devices having values which are to be checked and held within a specified range. Also, whereas the device of the invention is shown as having resistance thermometer bulbs, it should be understood that it may be readily adapted for use with thermocouples or other translating devices without departing from the spirit of the invention.

Other features and advantages will hereinafter appear.

In the accompanying drawings.

Figure 1 is a front elevational view of the improved indicator and alarm device of the invention.

Fig. 2 is a right side elevational view of the device shown in Fig. 1.

Fig. 5 is a top or plan view partly in section, of the selector switch and actuating mechanism.

Fig. 6 is a diagrammatic view of the complete indicator and alarm device and circuit.

Fig. 7 is a front elevational view similar to Fig. 1, but showing a different kind of temperature indicating means, and Fig. 8 is a diagrammatic representation of a modified form of control for the selector switch and alarm mechanism of the device.

Figure 3:
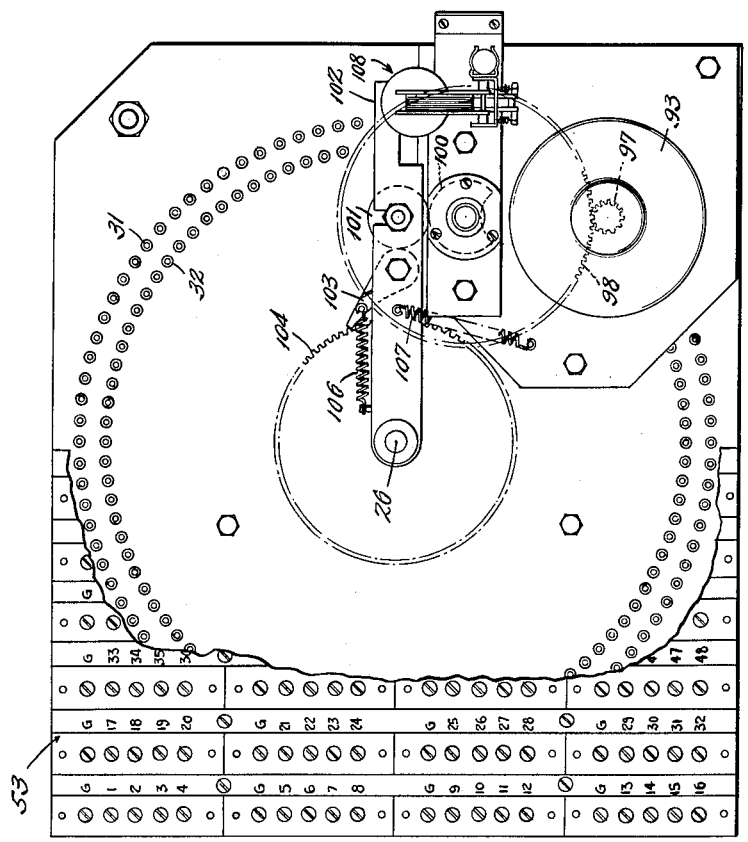
Fig. 3 is a fragmentary rear elevational view of the device of Figs. 1 and 2, part of the rear connector panel being broken away to reveal the back of the automatic selector switch mechanism.

Referring to Figs. 1, 2 and 3, the improved indicator and alarm apparatus of the invention comprises an upright housing or cabinet 10 of generally rectangular shape, having a front panel 11 and a rear wall 12. A temperature indicating and recording meter 13 is carried by the lower portion of the cabinet 10 at the front panel 11, the meter having the usual scale 14 and pointer 15, and having a circular chart 16 on which a record 17 is printed by means of a stylus 18. The meter 13 may be of any suitable type, and generally includes a bridge circuit for connection with a translating device such as a thermocouple or temperature-responsive resistor, and has means which may include a current source (not shown) for actuating the pointer 15 in response to change in the temperature of the thermocouple or resistor. Since such meters are well-known and the details per se form no part of the present invention, these details of the meter 13 are not further described herein.

Referring to Fig. 6 the meter 13 has terminals 19 for connection with a power supply whereby the bridge circuit of the meter may be energized. Also, the meter 13 has terminals 20 for connection to a thermocouple or temperature-responsive resistor unit.

Figure 4:
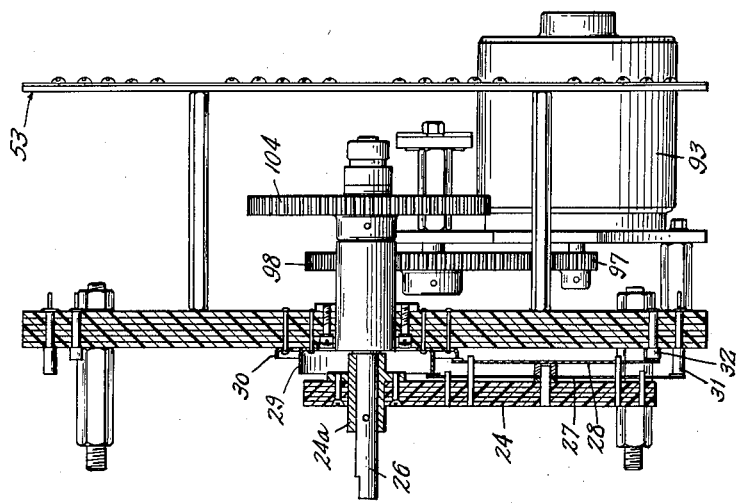
Fig. 4 is a side view partly in elevation and partly in section, of the automatic selector switch and actuating mechanism.

As shown in Figs. 1 and 2, the upper portion of the front panel 11 of the cabinet is provided with a circular scale 21 having graduations 22 totalling ninety-six in all and covering a 360° arc, the graduations being numbered in groups of eight. Cooperable with the scale 21 is a pointer 23 which is connected to move with an arm 24 of a rotary selector switch 25 mounted on the rear of the panel 11 behind the scale 21. As shown in Fig. 4, the arm 24 of the selector switch is carried on a bushing 24a secured to the switch shaft 26 which also mounts the pointer 23, and said arm carries a pair of contact blades 27 and 28 which are engageable at their inner ends with slip rings 29 and 30 respectively, and at their outer ends with concentric circular rows or sets of contacts 31 and 32 respectively.

Considering the diagrammatic showing and circuit of the present improved indicator and alarm apparatus in Fig. 6, the slip rings 29 and 30 of the selector switch 25 are connected by wires 33 and 34 to the terminals 20 of the indicating and recording meter 13. Thus any one of a plurality of thermocouples or heat-responsive resistors connected with paired contact points 31 and 32 of the selector switch 25 may be connected through the switch to the meter 13 to cause the latter to indicate and record its temperature, the particular thermocouple or resistor so connected being determined by the setting of the switch arm 24. The paired contacts 31 and 32 number ninety-six, one pair for each of the graduations 22 on the scale 21, and therefore as many as ninety-six different circuits may be connected sequentially and individually to the meter 13.

For purposes of simplicity of illustration, only four resistance bulbs or heat-sensitive elements 35, 36, 37 and 38 are shown, representing an installation on a single motor-generator set having four bearings whose temperatures are to be checked. Each of the resistance bulbs 35, 36, 37 and 38 is located at a different bearing of the motor-generator set, to be responsive to the heating or temperature of the bearing, and the bulbs may have their pairs of terminals connected, through an eight-wire cable 39, to pairs of terminals 40—41, 42—43, 44—45, and 46—47 of a connector block 48 indicated by a broken outline in Fig. 6. The connections are such that the bulb 35 has its terminals connected to the connector-block terminals 40, 41; the bulb 36 is connected to the connector-block terminals 42, 43 etc. and the bulb 38 is connected to the connector-block terminals 46, 47.

The connector block 48 may be located in a junction box indicated by the dot-and-dash outline 49, which may be secured to any suitable support at the motor-generator set. As shown, the connector block terminal 47 is grounded at 50, and is connected by a wire 51 with the terminals 45, 43 and 41.

From the junction box 49 a five-wire cable 52 extends to a terminal board 53, Figs. 3, 4 and 6, which preferably constitutes the rear wall 12 of the cabinet 10 of the apparatus. Through the cable 52 the connector block terminals 40, 42, 44 and 46 are respectively connected to terminals numbered 54, 55, 56, and 57 on the terminal board 53, and the connector block terminal 47 is connected with terminals 58, 59, 60 and 61 of the terminal boards 53. The terminals 54, 55, 56 and 57 are connected by wires 62, 63, 64 and 65 to consecutively located contact points 66, 67, 68 and 69 respectively, in the outer row of contact points 31 of the selector switch 25. The terminals 58, 59, 60 and 61 are respectively connected by wires 70, 71, 72 and 73 with contact points 74, 75, 76 and 77 consecutively located in the inner row of points 32 and paired with the points 66 through 69 respectively. Thus it will be seen that when the switch blades 27 and 28 engage the contact points 69 and 77 the resistance bulb 35 will be connected through the selector switch 35 to the meter 13; when the switch blades 27 and 28 are on the contact points 76 and 68, the bulb 36 will be connected to the meter 13, and so on.

Referring to Figs. 3 and 6, the terminal board 53 at the back of the cabinet 10 may carry a total of one hundred ninety-two terminals, grouped in banks of eight, each bank taking care of a single motor-generator set having four bearings and having four resistance bulbs associated with the bearings. The connections for one bank 78 of eight terminals have been described, and in Fig. 6 a second and third bank 79 and 80 of eight terminals are indicated as being available for connection to a second and third motor-generator set.

In carrying out the method of the present invention in the apparatus thereof, the arm 24 and contact blades 27 and 28 of the selector switch 25 are given a stepped advancing movement, and are preferably made to dwell on each different pair of points of the rows 31 and 32 for a very short period, of for example one and two-thirds seconds, and made to shift from one pair to the next of the contact points in one-fifth second, the one and two-thirds second dwell on each pair of contact points comparing with a time lag of two seconds in the meter 13, which represents the time required for the pointer 15 of the meter to travel from one extreme to the other of the scale 14, that is, from the zero indication to the 300° indication shown. I have found that, in conjunction with meter having a two-second time lag, by timing the selector switch so that the blades 27 and 28 thereof have a dwell of approximately one and two-thirds seconds, or five-sixths the time lag of the meter 13, the large total of ninety-six different thermocouples may be completely checked or rechecked in an interval of three minutes, with an adequate factor of safety, that is, without danger of the response of the meter 13 being so slow that it will not indicate a dangerous temperature condition in a bearing, in an installation of a large number of motor-generator sets. As will be hereafter brought out, an abnormal response of the meter 13, as for example an indication of 175°, is utilized to provide a signal or alarm, and therefore proper and complete meter response is extremely important.

Considering the time factors further, assuming that all of the pairs of contact points of the sets 31 and 32 are connected to resistance bulbs of individual bearings operating at normal temperatures, during a single complete revolution of the switch arm 24, or a complete single traversal of the contact points of the switch 25, the meter 13 will indicate and record within a certain relatively narrow range of temperature, corresponding to the normal temperatures of the bearings. This range is very much less than the 300° spread between the extremes of the dial 14 and may comprise a spread of 50°, for example from a temperature of 100° to a temperature of 150°. If the meter pointer 15 is indicating a normal temperature for one bearing and a succeeding bearing is overheated, having a temperature of 175° or over the meter pointer will not be called upon to traverse its entire scale in causing the alarm to be given when the selector switch is shifted to the succeeding pair of contact points. Instead, the meter pointer may have to travel only seventy-five degrees to cause the alarm, whereas, in any one-and-two-thirds second dwell of the switch, the meter pointer would have time to travel approximately 250° over the scale 14, and this amount of travel is of course much greater than the 75° travel needed to reach the 175° temperature at which an alarm will be given in a manner shortly to be described.

If for a given installation fewer than ninety-six bearings are to be checked, the pairs of contact points on the switch 25 which are not used are individually short-circuited, and this will cause the meter 13 to indicate zero on its scale. In this event, the maximum travel of the meter pointer would be from zero to 175° if, from a dead set of contacts the switch arm 24 should advance to contacts connected with a circuit leading to an overheated bearing. Here again, the travel of 175° is much less than the 250° travel that the meter pointer could have in a time of one and two-thirds seconds, allowing a generous margin of safety.

While for most uses a meter with a response having a time lag of two seconds between the extremes of its scale is considered to be practically instantaneous, it may be readily understood that where a large number of indications must be had in a relatively short time interval, as in the case of the apparatus of the present invention, the two-second time lag becomes an appreciable factor, being quite different from a truly instantaneous response and presenting a problem which I have satisfactorily solved by the apparatus and method of the present invention.

In accordance with the present invention an improved alarm mechanism and switch-actuating mechanism is provided, in conjunction with the meter 13 and the selector switch 25, whereby upon the meter indicating an overheated bearing temperature of, for example 175°, the selector switch will be halted and prevented from further advance, thereby indicating which bearing has too high a temperature, and whereby an alarm is given to call the operator's attention to the overheated condition.

This improved mechanism is so organized that the apparatus may be immediately made to resume its checking or rechecking of the remaining bearings of the installation, and the necessary repairs made in the equipment without impairing the function of the apparatus to discover and indicate other overheated conditions. Also, the arrangement is such that the alarm system of the apparatus may be easily and quickly checked for operativeness at any time.

As shown in Fig. 6, the meter 13 may have a pair of cooperable switch contacts 81 and 82, the latter contact being carried on an arm 83 having a projection 84 actuated by a cam 85 which is rotatable with the meter pointer 15. The cam 85 may be preset in various positions with respect to the pointer 15, whereby the switch contacts 81 and 82 will become separated when the pointer 15 reaches any desired temperature considered to be above normal, or unsafe. The switch arm 83 is connected by a wire 86 with one of the set of contacts 19 of the meter, said one contact being connected by a wire 87 through a master switch 88 to a current supply cord 89. A second wire 90 leads from the master switch 88 and supply cord 89, and connects with the other of the terminals 19 of the meter. Wires 91 and 92 lead from the wires 87 and 90 respectively, and connect with a constant-speed electric motor 93, and branch wires 94 and 95 lead from the wires 91 and 92 to an indicator lamp 96 which indicates when the master switch 88 is closed.

The motor 93 has a pinion 97 engaging and driving a gear wheel 98 mounted on a shaft 99 which carries a cam 100 engaged by a roller or cam follower 101 secured to a ratchet arm 102 pivotally carried on the shaft 26 of the selector switch 25. The ratchet 102 carries a pawl 103 engageable with a ratchet wheel 104 which is fixed to the shaft 26 and which can therefore drive the switch arm 24 and blades 27 and 28. The motor 93 is of the slow speed type, and the ratio of the pinion 97 and gear wheel 98 is such that the latter and the cam 100 make one complete revolution about every one and 88/100 seconds. The cam 100 has a cut-out or notch 105 so arranged that the switch arm 24 and blades 27 and 28 shift from one pair of contacts to the next in an interval of about one-fifth second, and the remainder of the cam is so arranged that the arm 24 and blades 27 and 28 remain at rest for an interval of one and two-third seconds, after which they are again advanced by the notched portion of the cam 100.

A helical extension spring 106 maintains the pawl 103 in engagement with the ratchet wheel 104, and a helical extension spring 107 maintains the follower or roller 101 in engagement with the cam 100.

For the purpose of halting the advancing movement of the selector switch arm 24 a relay 108 is provided, having a coil 109 connected by wires 110 and 111 respectively to the wire 90 and to the switch contact 81 in the meter 13. The relay 108 has an armature 112 which is normally spring-urged away from the relay core 113, the armature being held against the core whenever the relay coil 109 is energized. Such energization is effected whenever the switch contacts 81 and 82 engage each other. When the contacts 81 and 82 are disengaged, the relay armature 112 is pulled against a stop 114 to the dotted line position shown in Fig. 6, wherein the end of the armature may engage the end of the ratchet arm 102 and prevent the latter from descending the amount required to enable the pawl 103 to engage the next or succeeding notch in the ratched wheel 104. By this organization, whenever the relay 108 is deenergized, the cam 100 is rendered inoperative to lower the ratchet arm 102 and to again raise the arm to cause the stepped advance of the selector switch arm 24. The relay armature 112 is also engageable with an arm or extension 115 of a mercury switch 116 whereby the switch is open-circuited when the relay is energized, and whereby the switch may be actuated to close its circuit when the relay is deenergized. The switch 116 is connected by a wire 117 with a signal lamp 118 and with a gong 119, the said gong and lamp being connected by a wire 120 with the wire 110, and the mercury switch is also connected by a wire 121 with the wire 87. Thus, when the switch 116 is closed, the signal light 118 will be energized and the gong 119 will be sounded, and this will occur whenever the relay is deenergized by separating the switch contacts 81 and 82 as effected in response to the meter pointer 115 indicating an abnormally or dangerously high temperature condition.

From the foregoing description it will be understood that whenever any one of the resistance bulbs 35, 36, 37 or 38 is subjected to an abnormally high temperature, the instant that the selector switch 25 reaches the position wherein the said bulb is connected with the meter 13 the response of the latter will cause the switch contacts 81 and 82 to separate, and therefore the alarm 119 will be sounded and the signal light 118 energized, and also the advancing movement of the selector switch 25 halted all as a consequence of deenergization of the relay 108 by separation of said contacts.

In order to check for the operativeness of the alarm system comprising the gong 119 and signal bulb 118, a manually operable switch 122 is provided, having cooperable contacts 123 and 124 inserted in series with one of the wires leading from a contact point of the row of points 32 of the selector switch 25, and a resistor 125 has one end connected with a wire leading from the companion contact point of the selector switch, the other end of the resistor being connected with a contact 126 which is engageable with the switch contact 124 when the switch button 127 is depressed.

Normally the switch contacts 123 and 124 are in engagement with each other; however, if the switch button 127 should be depressed to cause the resistor 125 to be bridged across the wires leading from the pair of contact points of the selector switch 25, and if the resistor is made to have a value such that the meter 13 will indicate an excessively high or dangerous temperature, then when the switch arm 24 of the selector switch is engaging the said pair of contact points the meter 13 will indicate an abnormally high temperature and the alarm apparatus will function.

Regardless of the rotative position of the switch arm 24, at any time it may be easily manually shifted, as by grasping a knob 128 mounted on the shaft 26 of the switch, and turning the knob clockwise. By virtue of the pawl and ratchet actuator for the switch 25 the switch arm 24 and blades 27 and 28 may always be shifted manually in a clockwise direction, but will be prevented from being moved counterclockwise, and this manual shifting of the arm is an important feature of the invention since it enables the alarm mechanism of the apparatus to be tested at any time by merely first shifting the switch arm 24 and then depressing the button 127 of the test switch 122. Also, it enables an operator to shift the selector switch to any position desired so as to provide a quick indication of any particular motor generator set at any time.

If, for any reason a resistance bulb or bulb circuit need be repaired or replaced, this may be done according to the invention without resulting in an alarm being sounded by the apparatus, by the provision of means for connecting a normalizing resistor in the circuits of the junction box located at the motor generator set. This means comprises a rotary selector switch 129 having a pair of rotary blades 130 and 131 which are engageable respectively with sets of contacts 132 and 133. The switch 129 has an "off" position wherein the blades 130 and 131 rest on a pair of contacts 132, 133, and the contact 132 of said pair is connected by a wire 134 with a signal lamp 135 which is in turn connected by a wire 136 with the switch blade 130. A wire 137 connects the wire 136 with a supply line, and a wire 138 connects the supply line with a resistor 139 which is in turn connected by a wire 140 with the wire 134. The switch blade 131 is connected with a resistor 141 which is in turn connected by a wire 142 with the connector block terminal 47. The individual contacts in the set 133 of the selector switch 129 are connected respectively by wires 143, 144, 145 and 146 with the terminals 46, 44, 42 and 40 of the connector block 48. If the switch blades 130 and 131 of the switch 129 are shifted to either of the operative positions indicated, the resistor 141 will be connected across one of the resistance bulb circuits connected to the connector block 48. The resistor 141 is made to have a value such that it will cause the meter 13 to indicate a normal temperature just below the danger point, with the resistance bulb circuit open at a point beyond where the resistor bridges the circuit. Thus, by properly setting the selector switch 129 any one of the bulbs 35 to 38 or the circuits therefor may be removed or repaired, and when the master selector switch 25 reaches the point where it connects the circuit being repaired to the meter 13 it will register a normal temperature and no alarm will be sounded. For any of the testing or operating positions of the switch 129, the warning light 135 will be energized, indicating that a circuit is being bridged by the normalizer resistor 141. When the switch 129 is in the "off" position, the warning light 135 will be short-circuited, thereby deenergizing the light and indicating to an operator that the system is properly connected for the meter 13 to indicate the temperatures of the bearings of the motor-generator set.

The improved indicator and alarm apparatus of this invention is extremely reliable in its operation and has been found to be trouble-free in accelerated tests conducted to determine useful life. Also, it is extremely flexible in that the selector switch 25 may be manually set at the will of the operator so as to check the condition of any particular piece of equipment, or may be set in the position indicated as number ninety-six in Fig. 1 and the operativeness of the alarm system easily checked by depressing the switch button 127, which incidentally is shown in Fig. 1 as located at the right hand edge of the front panel.

By virtue of the stepped movement of the selector switch 25 and the construction of the switch an extremely large number of temperatures may be continually checked and rechecked, and by virtue of the short dwell of the selector switch and short period of movement thereof, the interval required to completely check a large installation of equipment is made relatively short, it being in the present instance three minutes for checking ninety-six different temperatures. Moreover, if at any time it is necessary to repair a resistance bulb or bulb circuit, this may be done without affecting the operativeness of the apparatus and without resulting in an alarm being sounded, by the simple means illustrated in Fig. 6 comprising the rotary selector switch 129 and the normalizing resistor 141; and by the provision of the warning light 135 the likelihood of the selector switch 129 being left in any one of its "on" positions, thereby rendering inoperative the resistance bulb associated with such position, is minimized.

Contributing to the reliability of the apparatus is the organization including the relay 108 whereby deenergization of the relay coil 109 results in the signals 118 and 119 being operated, since by this structure any burn-out or open-circuiting of the relay coil, which would cause the relay to be inoperative, will result in a signal being given.

In accordance with the invention the selector switch 25 is constructed in a novel manner whereby a positive and reliable contact is established at all times between the slip rings 29 and 30 and the sets of contacts 31 and 32, this being accomplished with a very simple and economical construction. In an apparatus of the type described herein, extreme reliability is essential, since failure of the apparatus might result in serious damage to costly equipment, and therefore proper functioning of the switch 25 is very important.

Referring to Fig. 5, the switch arm 24 is provided with a pair of short pins 147 and 148, and with a pair of long pins 149 and 150, and provided with a fifth pin 151 located between the pins of the said pairs. The pin 151 carries a pair of insulating washers 152 and 153, between which the switch blade 27 is disposed, the blade having a large aperture 154 to provide clearance for the pin 151. The blade 27 has a pair of large apertures 155 and 156 to clear the long pins 149 and 150, and has a slot 157 through which the short pin 147 extends, and into which it closely fits. Also, the switch blade 27 is apertured to provide a close fit around the short pin 148. The ends of the blade 27 have contact shoes 158 formed of contact metal, and the slot 157 in the blade by engagement with the short pin 147 causes the blade to be held out of contact with the long pins 149 and 150.

The switch blade 28 has a slot 159 to admit the long pin 149 which closely fits in the slot, and the blade is apertured to closely fit around the long pin 150, the ends of the blade 28 having contact shoes 160. The center portion of the blade 28 presses against the insulating washer 153, and both of the blades 27 and 28 are biased to cause them to continually press against the contact rings 29 and 30 and the sets of contact points 31 and 32.

The switch blade organization as described above provides for a simple and quick, economical assembly, since the blades are merely slipped over the pins and are held in place by their broadside engagement with the slip rings and contact points, and the organization also insures that reliable contact is established between the slip rings and the points.

While the meter 13 shown in Figs. 1 and 2 is indicated as being of the recording type, it need not be so, since an indicating meter without recording means may be employed instead, as shown in the modification of the invention illustrated in Fig. 7.

A modification of the invention is shown in Fig. 8. This figure illustrates an alarm system and a control for actuating the selector switch 25 whereby the switch is halted, in response to an abnormal temperature condition, by deenergizing the driving motor for the switch. Like elements in Figs. 8 and 6 have been given the same characters.

In Fig. 8 the master switch 88 connecting with the A. C. supply line 89 has wires 162 and 163 for connection respectively to the terminals 19 of the meter 13, and the wire 164 is shown for connection to the stationary contact 81 of the control switch in the meter 13. Thus the circuit shown in Fig. 8 may be substituted for the motor energizing and alarm circuit of Fig. 6, so as to be connected to the meter 13 for control thereby.

A two-phase electric motor 165 is provided for driving the pinion 97, which in turn drives the gear wheel 98 connected to the cam 100. The motor 165 has four terminals, one of which is connected by a wire 166 to a condenser 167 in turn connected to a resistor 168 which latter is connected by a wire 169 with another terminal of the motor. The two remaining terminals of the motor are connected together by a wire 170, these connections representing the usual type of condenser phase-displacement whereby a rotating field is established in the motor. The wire 169 is connected by a wire 171 to the wire 162. The wire 170 is connected by a wire 172 to a resistor 173 in turn connected by a wire 174 with a second resistor 175 which latter is connected by a wire 176 with a fuse 177. The other terminal of the fuse 177 is connected with the wire 176, and the pilot lamp 96 has its terminals connected to the wires 176 and 171 as shown.

In conjunction with the resistors 173 and 175 a D. C. relay 178 is provided, to be operated by the voltage drop existing across the resistors. The relay 178 has a coil 179 one end of which is connected to the wire 174, the other end of the coil being connected to a wire 180 connecting with half-wave rectifiers 181 and 182 which are in turn connected by wires 183 and 184 respectively with the wires 172 and 176.

By this organization alternating current from the supply line 89, in traversing the resistors 173 and 175 will provide a voltage drop across the resistors whereby direct current will be caused to flow through the relay coil 179 because of the presence of the rectifiers 181 and 182 in the relay coil circuit.

The relay 178 has an armature 185 connected by a wire 186 with the gong 119, the other terminal of which is connected by a wire 188 to the wire 171. The relay armature 185 is cooperable with a fixed contact 189 connected by a wire 190 with the wire 163. The signal light 118 has its terminals connected respectively to the wires 186 and 188.

Operation of the alarm and control circuit of Fig. 8 is as follows: When the switch 88 is closed, the motor 165 will rotate at synchronous speed, and the voltage drop existing across the resistors 173 and 175 in the motor supply line will cause energization of the relay 178 whereby the armature 185 of the relay will be attracted and held disengaged from the relay contact 189. If the meter 13 should be actuated in response to an abnormal temperature condition, so as to separate the switch contacts 81 and 82 in the meter, the circuit of the motor 165 will be opened, and the motor will be halted. This will halt the selector switch 25. Also, it will deenergize the relay 178 whereupon the armature 185 thereof will engage the cooperable contact 189, causing the gong 187 and signal light 191 to be energized.

It will be noted that if for any reason the motor 165 should become short-circuited and rendered inoperative the excess current would cause the fuse 177 to blow, whereupon deenergization of the relay 178 will result in the alarm gong 119 being sounded and the signal light 118 being energized. Also, the pilot light 96 will be extinguished.

Variations and modifications may be made within the scope of this invention and portions of the improvements may be used without others.

I claim:

1. In a measuring apparatus, a plurality of circuits each including an instrumentality having a measurable value; a meter adapted for use with said circuits, to measure the said values; means for sequentially connecting said circuits individually with said meter, said means comprising a selector switch including a switch arm having a plurality of different positions, and comprising an actuating mechanism for imparting a stepped advancing movement to the switch arm and causing the arm to dwell at rest in each position for a predetermined interval of time, said actuating mechanism including a ratchet wheel and pawl, and including a continually rotating cam and a cam follower engageable with said cam and connected to operate the pawl; and means for holding said cam follower out of full engagement with said cam when the meter indicates a predetermined value other than normal for any one of said instrumentalities, thereby to halt the advance of the switch arm.

2. In a measuring apparatus, a plurality of circuits each including an instrumentality having a measurable value; means adapted for use with said circuits, to measure the said values; means for automatically sequentially connecting said circuits individually with said measuring means, said means comprising a selector switch including a switch arm having a plurality of different positions, and comprising an actuating mechanism for imparting a stepped advancing movement to the switch arm whereby the arm dwells in each position for a predetermined interval of time, said mechanism including a ratchet wheel and pawl, and including a continually rotating cam and a cam follower engageable with said cam and connected to operate the pawl; a relay having an armature; means actuated by said armature for holding said cam follower out of full engagement with said cam when the relay coil is deenergized; means for deenergizing said relay coil and thereby rendering said actuating mechanism inoperative to advance the switch arm when the meter indicates a predetermined value other than normal for any one of said instrumentalities; a signal; and means for operating the signal when the relay coil is deenergized by other-than-normal indication of the meter, failure of the relay coil thereby automatically causing the signal to be operated.

3. In an electrical apparatus, a plurality of circuits each including an electrical means having a measurable value variable with changes in a condition; electric indicating means adapted for use with said circuits; means including an alternating current motor and an alternating current supply circuit for the motor, for automatically sequentially connecting said circuits individually with said indicating means to cause operation of the latter; means operable by said indicating means when the latter is indicating a predetermined value other than normal for rendering inoperative said automatic connecting means by opening the motor supply circuit; a signal; and means actuated in response to the automatic connecting means being rendered inoperative, for causing said signal to be operated, said last-named means including a pair of series-connected resistors in series with the motor supply circuit, a direct-current electric relay, rectifiers, and circuit means connecting said resistors, relay and rectifiers to provide D. C. energization of the relay when the motor supply circuit is energized.

4. In a temperature indicating apparatus, a plurality of temperature-checking circuits each including a temperature-responsive electrical means having a variable, measurable electrical value maintained within a normal predetermined range in response to predetermined normal temperatures; means adapted for use with said temperature-checking circuits for translating said values into temperature indications; means for automatically sequentially connecting said temperature-checking circuits individually with said translating means, sequentially establishing closed circuits with said means; a control means operated by said translating means when the latter is indicating a predetermined temperature other than normal; an electrical means having a measurable electrical value within the said normal predetermined range and of a like character to the values of the said temperature-responsive means; means including a selector switch connected with said temperature-checking circuits and under the control of an operator for connecting said last-named electrical means in shunt with a predetermined portion of any one of said temperature-checking circuits, enabling the translating means, throughout the sequential connections made thereto, to indicate a normal temperature when there is an open-circuit condition of another portion of said one circuit more remote from said translating means, thereby to enable said other portion to be disconnected for its removal or repair without causing operation of said control means; a signal; and means for operating said signal whenever the selector switch connects said last-named electrical means to any one of said circuits.

5. In a measuring apparatus, a plurality of circuits each including an instrumentality having a measurable value; a meter adapted for use with said circuits to measure the said values; means for automatically sequentially connecting said circuits individually with said meter, said means comprising a selector switch including a switch arm having a plurality of different positions, and comprising an actuating mechanism including a continually rotating timing motor and intermittently operated member actuated thereby, for imparting a stepped advancing movement to the switch arm and for causing the arm to dwell at rest in each position for a predetermined interval of time; a signal means; a normally continuously energized magnet coil; means de-energizing the magnet coil when the meter indicates a predetermined value other than normal for any one of said instrumentalities; means independent of said timing motor and made operable when the magnet coil is de-energized, preventing actuation of said intermittently-operated member and rendering the actuating mechanism inoperative to advance the switch arm without halting said motor; and means for operating the signal means when the magnet coil is de-energized whereby either an abnormal indication by the meter or burn-out of said coil will cause the signal to be operated.

6. In a measuring apparatus, a plurality of circuits each including an instrumentality having a measurable value; a meter adapted for use with said circuits to measure the said values; means for automatically sequentially connecting said circuits individually with said meter, said means comprising a selector switch including a switch arm having a plurality of different positions, and comprising an actuating mechanism including a continually rotating timing motor and an intermittently operated member actuated thereby, for imparting a stepped advancing movement to the switch arm and for causing the arm to dwell at rest in each position for a predetermined interval of time; a signal means; a normally continuously energized magnet coil; means de-energizing the magnet coil when the measuring means indicates a predetermined value other than normal for any one of said instrumentalities; means independent of said timing motor and made operable when the magnet coil is de-energized, preventing actuation of said intermittently-operated member, thereby to halt movement of the switch arm without stopping said motor; and means operable simultaneously with said preceding means for actuating the signal means whereby either an abnormal indication by the meter or burn-out of said coil will cause the signal to be actuated.

References Cited in the file of this patent

UNITED STATES PATENTS

| 1,867,870 | Baker | July 19, 1932 |
| 2,027,945 | Widmer | Jan. 14, 1936 |
| 2,339,116 | Smith | Jan. 11, 1944 |
| 2,420,969 | Newell | May 20, 1947 |
| 2,449,304 | Lamb | Sept. 14, 1948 |
| 2,549,401 | Stein et al. | Apr. 17, 1951 |

FOREIGN PATENTS

| 322,333 | Germany | June 26, 1920 |